Dec. 17, 1929. L. A. HAZELTINE Re. 17,530
WAVE SIGNALING SYSTEM
Original Filed Feb. 27, 1925
Fig. 1a,
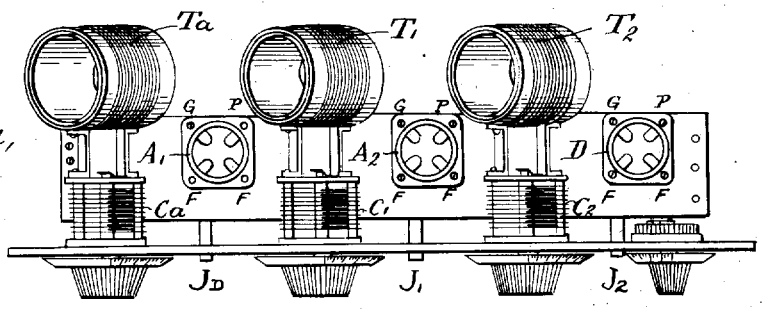
Fig. 1b,
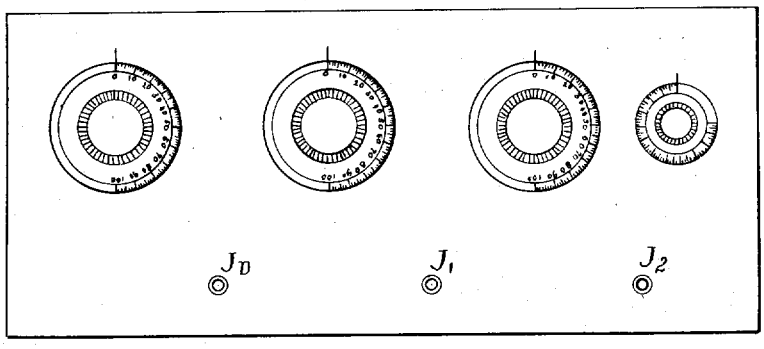
Fig. 1c.
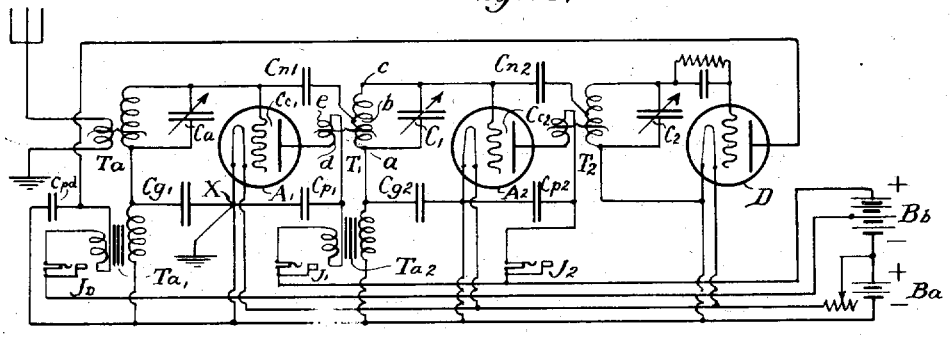
Fig. 1d,
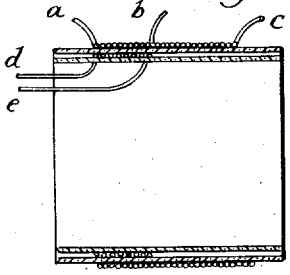
Fig. 1e,
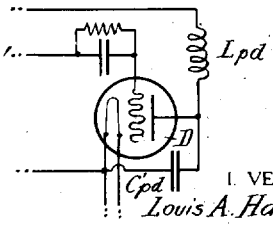
INVENTOR
Louis A. Hazeltine
BY
Penne, Davis, Marvin and Edmonds.
ATTORNEYS Reissued Dec. 17, 1929 Re. 17,530

UNITED STATES PATENT OFFICE

LOUIS ALAN HAZELTINE, OF OAKLAND, CALIFORNIA, ASSIGNOR TO HAZELTINE CORPORATION, A CORPORATION OF DELAWARE

WAVE SIGNALING SYSTEM

Original application filed February 27, 1925, Serial No. 12,000, and in Canada May 4, 1925. Original No. 1,648,808, dated November 8, 1927. Divided and application filed January 4, 1927, Serial No. 158,839, Patent No. 1,650,353, dated November 22, 1927. Application for reissue filed February 14, 1929, Serial No. 339,965.

This application is a division of my application Serial No. 12,000, filed February 27, 1925, Patent No. 1,648,808, granted November 8, 1927.

This invention relates to wave signaling systems, particularly radio receiving systems, and has for its object the provision of a radio receiver which is highly sensitive and highly selective and at the same time is simple to control. This result is accomplished primarily by employing tuned radio-frequency amplification, preferably in more than one stage, with the complete elimination of couplings between the plate circuits and the grid circuits, except through the mutual conductance of the amplifying vacuum tubes, which when they include three electrodes are sometimes called "triodes," and with an arrangement of the amplifier transformers so that their input conductances are related in a certain way to the conductances of the vacuum tubes. Other features of the invention have to do with particular arrangements of the apparatus in ways that are both convenient and efficacious, as will appear in the discussion which follows.

The elimination of coupling between the plate circuits and the grid circuits is accomplished by the cooperation of three steps: first, the arrangement of the amplifier transformers so that there is no magnetic coupling between any two of them; second, the avoidance in the wiring of any substantial impedance common to two or more tuned circuits; and third, the neutralization of the natural capacity coupling inherent between the tuned circuits, including particularly that due to the capacity between the grid and the plate of the vacuum tube.

The elimination of undesirable coupling between the plate and grid circuits results in the prevention of feed-back or regenerative action: and consequently there is no tendency towards the production of local oscillations. Such regenerative action is most troublesome with sharply tuned circuits and at high frequencies.

The proper input conductance of the amplifier transformers is obtained by employing a primary winding of fewer turns than has previously been the practice. The results are: (1) high selectivity; (2) substantially complete neutralization of capacity coupling over a wide range of frequency with fixed neutralizing adjustments, even though there be slight unavoidable deviations from the ideal conditions for neutralization; and (3) higher amplification than is obtained with the large number of primary turns previously customary.

Referring to the drawings:

Figures $1^a$ and $1^b$ show a plan and an elevation, respectively, of a tuned radio-frequency amplifier embodying the features of this invention.

Figure $1^c$ shows the diagram of connections of the receiver of Figures $1^a$ and $1^b$.

Figure $1^d$ shows the structure of the radio-frequency amplifier transformers of Figures $1^a$ and $1^b$.

Figure $1^e$ shows a modification of the circuit of Figure $1^c$.

In the radio receiver represented in Figures $1^a$ and $1^b$ there are three radio-frequency transformers $T_a$, $T_1$, $T_2$, each associated with a tuning condenser $C_a$, $C_1$, $C_2$. Each coil is mounted on the back of its condenser for the purpose of keeping as short as possible the leads between them, and for other purposes as disclosed in my U. S. Letters Patent Nos. 1,577,421 and 1,698,364. The vacuum tubes are mounted adjacent to the coils and condensers with which they are associated, also in order to keep the connecting leads as short as possible. The coils of each transformer are preferably of the single-layer type, as illustrated in Figure $1^d$, and are mounted with axes parallel and at an angle of substantially 55 degrees with the line of centers, this being a convenient arrangement resulting in zero magnetic coupling between any two of the transformers, as described in my two patents above referred to. Care is also taken to avoid magnetic coupling between stages that might be due to closed conducting loops linked with the fields of two or more transformers. Such loops might exist in a supporting metal framework, or in the leads from the batteries, which leads are therefore preferably bunched together.

Figure 1[e] shows the diagram of connections for the receiver of Figures 1[a] and 1[b]. The reflex principle is employed by which radio-frequency amplifying tubes $A_1$ and $A_2$ serve also as audio-frequency amplifying tubes through the use of two audio-frequency transformers $T_{a1}$ and $T_{a2}$. The jacks $J_D$, $J_1$, $J_2$, enable a head telephone receiver or loud-speaker to be plugged in the plate circuit of the detector tube or either of the audio-frequency amplifier tubes.

Since each coil of an audio-frequency transformer has a high impedance to radio-frequency current, by-pass condensers $C_{g1}$, $C_{g2}$, $C_{p1}$, $C_{p2}$, $C_{pd}$ are arranged to provide low-impedance return paths for the radio-frequency grid and plate currents direct to the respective filaments, or cathodes. This keeps radio-frequency currents out of the common battery leads, which may have sufficient reactive impedance as to cause objectionable coupling if they carry radio-frequency currents of different stages. The grid by-pass capacities $C_{g1}$, $C_{g2}$ may be of the order of one ten-thousandth microfarad, and the plate by-pass capacities, $C_{p1}$, $C_{p2}$, $C_{pd}$, may be of the order of one thousandth microfarad, these values giving low radio-frequency impedances but sufficiently high audio-frequency impedances not to shunt unduly the audio-frequency transformer coils and so lower the audio-frequency amplification. The leads to the by-pass condensers should be short to minimize their reactive impedances.

In case the radio-frequency current in the plate circuit of detector tube D passes in appreciable amount through the primary of $T_{a1}$ and so couples tube D with tube $A_1$, then a radio-frequency impedance $L_{pd}$ (Figure 1[e]) may be inserted in the lead from the plate of tube D, and a condenser $C'_{pd}$ may be connected directly from this plate to the filament. Care must be taken that the impedance coil $L_{pd}$ is not coupled magnetically to any of the radio-frequency transformers.

The filament system should be grounded, preferably at X, Figure 1[c], so that radio-frequency current passing from the antenna through the natural capacity between the coils of $T_a$ will flow directly to ground and not through the battery leads to the other tuned circuits and thence through their natural capacities to ground, which would result in undesirable coupling between the stages.

Coupling between the plate circuit and the grid circuit of tube $A_1$, due to the natural capacity $C_{c1}$ between the grid with its connected apparatus and the plate with its connected apparatus, is neutralized by the neutralizing capacity $C_{n1}$ connected between the grid and the auxiliary coil *ab*, which in Figure 1[c] is a portion of the secondary coil *ac* of transformer $T_1$. As explained in my U. S. Letters Patents No. 1,489,228 and No. 1,533,858, neutralization will be effected when the primary coil *de* and the auxiliary coil *ab* are coupled electromagnetically and have terminals *a* and *e* which connect to the filament system, of opposite polarity, and when the ratio of the number of turns of *ab* to the number of turns of *de* is equal to the ratio of $C_{c1}$ to $C_{n1}$. The same arrangement and relation applies, of course, to the neutralizing capacity $C_{n2}$ and the output transformer $T_2$, associated with the second amplifier tube $A_2$.

Figure 1[d] shows the construction of the transformers $T_1$ and $T_2$. The primary winding *de* is mounted so as to have close magnetic coupling to the tapped portion *ab* of the secondary coil *ac*, the tap *b* connecting to the neutralizing condenser $C_{n1}$, or $C_{n2}$, as shown in Figure 1[c]. To make the coupling as close as possible between the auxiliary coil *ab* and the radio-frequency plate circuit, the leads from *d* and *e* and the leads to the plate by-pass condenser $C_{p1}$ or $C_{p2}$, Figure 1[c], should be made as short as possible. Such closeness of coupling is needed because the radio-frequency current flowing conductively through the plate of the vacuum tube would build up an appreciable voltage in the leakage reactance of the plate circuit, which voltage would not be balanced by a voltage in the auxiliary coil *ab*. The primary and secondary coils in Figure 1[d] are wound in the same direction, with the result that terminal *a* connecting to the filament system, Figure 1[c], is of opposite polarity to terminal *e* also connected to the filament system, (or, in other words, the low-potential terminals *a* and *e* are of opposite polarity, and the same is therefore true of the high potential terminals *c* and *d*) as required for the purpose of neutralization. The connection of the neutralizing condenser to a tap *b* so that *ab* is a small portion of the secondary winding allows close coupling to be obtained between *ab* and *de* and at the same time requires the primary winding *de* to extend under only a small portion of the secondary, thus minimizing natural capacity and dielectric loss due to the dielectric field between primary and secondary. The primary winding, as indicated, is placed adjacent to the filament end *a* of the secondary winding, for the same purpose.

In addition to the direct magnetic coupling between the primary coil *de* and the auxiliary or neutralizing coil *ab*, of Fig. 1[d], there exists also an indirect coupling between those coils due, first, to the direct magnetic coupling between the primary coil *de* and the secondary coil *ac*, and, secondary, to the connection of a tuning condenser $C_1$ at the terminals *a* and *c* of the series-connected coils *ab* and *bc*. This indirect coupling substantially improves the neutralization under operating conditions (especially at resonance) by effectively increasing the coupling between the primary coil *de* and the neutralizing coil *ab*.

In general there will exist natural capacity between the apparatus connected to the grid of $A_1$ and apparatus connected to the grid of $A_2$. Such natural capacity has a neutralizing tendency and so in part supplants $C_{n1}$. This neutralizing capacity is relatively more effective, for a given value, as the ratio of turns of *ac* to *de* is greater than that of *ab* to *de*. Since *ac* is not so closely coupled to *de*, such neutralization is not ideal and therefore should be minimized. This may be accomplished by making as short as possible all leads connecting to the grid, and by employing tuning condensers of the shielded type or a grounded metal plate on the back of the panel. Other grounded conductors, such as the battery leads and the audio-frequency transformers, interposed in the dielectric fields between the tuned circuits also serve as partial shields.

On account of the difficulty of accurately measuring or calculating very small capacities, particularly natural capacities, the proper neutralizing capacities $C_{n1}$ and $C_{n2}$, Figure 1[c], are in practice determined by trial. A suggested procedure for neutralizing is as follows: First, with the filament of $A_2$ cold and those of $A_1$ and D lighted, a strong signal is tuned in, as heard on a telephone receiver plugged in the detector plate circuit; $C_{n2}$ is then adjusted until the signal disappears, showing that no coupling exists between the plate circuit and the grid circuit of $A_2$. Then with the filaments of D and $A_2$ lighted and that of $A_1$ cold, the process is repeated with $C_{n1}$.

On account of the proximity of the radio-frequency transformers to one another and more especially of the presence of a loop formed by the leads between each secondary and its tuning condenser, the actual coil inclination for zero magnetic coupling may differ slightly, but appreciably, from its theoretical value of substantially 55 degrees. Hence, the proper inclination must also be determined by trial, and may be in accordance with the following procedure. With all coils at the same inclination, $C_{n1}$ and $C_{n2}$ are adjusted for zero coupling as described in the preceding paragraph, with the circuits tuned first for a low frequency and then for a high frequency. In general, the settings found for the two frequencies will be different, showing that the capacity coupling, which varies with the frequency, is being called upon to compensate for some magnetic coupling. The coil inclinations are then varied together, until the settings of $C_{n1}$ and $C_{n2}$ are found to be the same at the two extreme frequencies.

The determination of the proper coil angle need ordinarily be made only once for a given design of receiver, but the adjustments of the neutralizing capacities are made in each individual receiver.

The use of short grid leads, the separation of the tuned circuits, and the interposition of grounded conductors, all serve to minimize the natural capacity coupling between $T_a$ and $T_2$, Figure 1[c]. In addition, the antenna lead-in should be kept, as indicated, at the end of the receiver remote from the circuit of $T_2$; and ungrounded conductors should not be allowed to extend from the neighborhood of $T_a$ to the neighborhood of $T_2$. By taking these precautions, the natural capacity coupling between $T_a$ and $T_2$ may be substantially eliminated, and so need not be neutralized.

When the telephone receiver is plugged into the third jack $J_2$, the plate and grid circuits of the tube $A_1$ will have the same natural audio frequency if the transformers $T_{a1}$ and $T_{a2}$ are alike. This would tend to give considerable audio-frequency regeneration due to the coupling capacity $C_{c1}$ between the plate and the grid of $A_1$. This coupling capacity will be neutralized by $C_{n1}$ for audio frequency, provided the ratio of turns in the audio-frequency transformer $T_{a2}$ is the same as the ratio of turns of *ab* to *de* and its relative polarity is as indicated,—that is, the same condenser serves to neutralize capacity coupling both at radio frequency and at audio frequency.

We will now consider the proper value of the effective ratio $\tau$ of secondary turns *ac* to primary turns *de* in the amplifying transformers. (By "effective ratio" is meant the ratio that would give the same mutual inductance with the same secondary self-inductance if the coupling between primary and secondary had a coefficient of unity. If the coupling is actually less than unity, the number of primary turns must be correspondingly increased relative to the number of secondary turns.) The amplification for one stage is given by the expression $$\frac{\mu\tau g_p}{\sqrt{[g_p+\tau^2 g_s]^2+\tau^4[\omega C_s-1/(\omega L_s)]^2}} \quad (1)$$

where the symbols have the following significances:

$\mu$, is amplification factor of vacuum tube;
$\omega$, is angular frequency;
$C_s$, $L_s$, $g_s$, capacity, self-inductance and conductance of secondary circuit;
$g_p$, plate conductance of vacuum tube.

At resonance the above expression for amplification reduces to $$\frac{\mu\tau g_p}{g_p+\tau^2 g_s} \quad (2)$$

which has its maximum value when $$g_p=\tau^2 g_s. \quad (3)$$

Since at resonance the input conductance of the transformer is equal to $\tau^2 g_s$, the last condition may be expressed in the form: that the amplification at resonance is a maximum when the ratio of turns of the transformer is so chosen that the input conductance of the transformer is equal to the plate conductance of the vacuum tube. If the number of primary turns is reduced below this value, the amplification falls off, but less rapidly at resonance than at other frequencies. For example, if the number of primary turns is halved relative to its value for maximum resonant amplification, the amplification at frequencies far from resonance is also halved, but the amplification at resonance is reduced only twenty per cent. The result is a decided gain in selectivity, since interfering signals are weakened proportionately more than the signal tuned in. Thus to obtain high selectivity together with good amplification, the ratio of turns should be so chosen that the input conductance $\tau^2 g_s$ is substantially, but not greatly, higher than the plate conductance $g_p$.

The following values are representative of present day practice in radio telephone broadcast reception:

$\mu = 8$;
$\omega = 5$ radians per microsecond;
$L_s = 0.25$ millihenry;
$C_s = \frac{1}{\omega^2 L_s} = 0.16$ millimicrofarad;

$g_s = 0.005\omega C_s = 0.004$ millimho (this value includes the conductance of the coil $L_s$, that of the condenser $C_s$, and that of the grid-filament circuit, the last ordinarily being negligible when a grid bias is used, as by the battery $B_c$, Figure 5[a]);
$g_p = 0.1$ millimho.

If we use one-half the optimum number of primary turns, the effective turn ratio will be $$\tau = 2\sqrt{\frac{g_p}{g_s}} = 2\sqrt{\frac{0.1}{0.004}} = 10.$$

The amplification at resonance is then $$\frac{\mu\tau g_p}{g_p + \tau^2 g_s} = \frac{8 \times 10 \times 0.1}{0.1 + 10^2 \times 0.004} = 16.$$

With the form of transformer shown in Figure 1[d], the following design data will give constants approximating those listed in the preceding paragraphs: secondary coil, 60 turns of No. 24 A. W. G. double-cotton-covered copper wire wound closely on a three-inch cylindrical tube of good dielectric material; primary coil, 8 turns of the same or smaller wire wound on a 2.75 inch tube and spaced so as to lie under the tapped portion of the secondary coil.

The transformer $T_a$ preferably has a like secondary coil to $T_1$ and $T_2$, but its primary coil usually should have more turns, especially if the antenna to be employed is of small capacity and resistance. With a considerable step-up ratio, the capacity and resistance of the antenna are equivalent to much smaller capacity and resistance in the secondary circuit.

With the antenna polarity indicated for $T_a$, Figure 1[c], adjacent turns of primary and secondary are at the same radio-frequency potential; so there is no dielectric field between primary and secondary, as there is in $T_1$ and $T_2$. Hence, $T_a$ has less natural capacity than $T_1$ and $T_2$, which tends to compensate for the capacity added by the antenna. The three condensers being alike, the three tuning dials represented in Figure 1[b] will thus read nearly alike when all are adjusted to any one frequency. This greatly simplifies the process of tuning the receiver. The result just described, i. e., that all tuning dials will read substantially alike when in proper adjustment for reception is, of course, dependent on the absence of regenerative action and contrasts with prior receivers employing tuned radio-frequency amplification without the elimination of undesirable coupling between stages, for in such receivers detuning of the amplifier output circuits was ordinarily necessary for the control of regeneration and oscillation, and, in any case, the tuning adjustment was dependent upon the regeneration present, and therefore upon the state of the batteries and of the vacuum tubes.

I claim:

1. A sharply selective, radio-frequency amplifying receiver comprising a triode having a grid, a plate and a cathode; means for applying radio frequency waves across said grid and cathode; a radio frequency transformer of the air core type comprising a primary coil of a few turns and a spaced secondary coil of more turns coupled to said primary coil so that substantially sharp, independent tuning of said secondary coil may be effected; a variable condenser for tuning said secondary coil; an amplifying source of direct current energy; circuit connections from said plate through said primary coil and said source to said cathode and from such terminal of said secondary coil to said cathode that coil terminals of unlike electro-magnetic polarity lead to said cathode; and a reverse feed back coupling substantially to neutralize the grid and plate feed back coupling associated with said triode comprising a limiting condenser of suitable low capacity, a tap-off from a suitable potential point on said secondary coil to said limiting condenser and a connection to said grid from said limiting condenser.

2. The receiver as defined in claim 1 and further characterized by the following that a second similar triode has connections across its grid and cathode from the terminals of said secondary coil whereby said second triode is responsive substantially only to the wave energy transferred from said primary coil to said secondary coil; a second similar air-core radio frequency transformer with its primary coil energized from the plate of said second triode and said source of direct current energy; terminals of unlike polarity of the primary and secondary coils of said second transformer being connected to the cathode of said second triode; a second variable condenser connected across the terminals of the secondary coil of said second transformer for selective tuning substantially independently; and a second reverse feed back coupling substantially to neutralize the grid and plate feed back coupling associated with said second triode comprising a limiting condenser of suitable low capacity, a tap-off from a suitable potential point on said secondary coil to said limiting condenser and a connection to the grid of said second triode from said limiting condenser.

3. In an amplifier, a vacuum tube provided with a grid, a filament, and a plate, a grid circuit, a plate circuit, inherent capacity coupling between said grid circuit and said plate circuit, an output transformer associated with said plate circuit and having primary and secondary windings, a tap on said secondary winding, and a neutralizing capacity connected between said tap and said grid, said primary winding being placed in proximity to the portion of said secondary winding included between the tap and the low-potential end of said secondary winding, whereby natural capacity and dielectric loss due to the dielectric field between said primary and secondary windings are minimized.

4. In an amplifier, a vacuum tube provided with a grid, a filament and a plate, a grid circuit, a plate circuit, inherent capacity coupling between said grid circuit and said plate circuit, an output transformer associated with said plate circuit, said output transformer comprising a single-layer secondary coil having a tap and a single-layer primary coil placed in close proximity to the turns of said secondary coil included between the tap and the low-potential end of said secondary coil, whereby the coupling between the primary coil and said turns of the secondary coil is close, and a neutralizing capacity connected between said tap and said grid.

5. In an amplifier, a vacuum tube provided with a filament, a grid, and a plate, a grid circuit, a plate circuit, capacity coupling between said plate circuit and said grid circuit, an output transformer associated with said plate circuit, said output transformer comprising a single-layer secondary coil provided with a tap and a single-layer primary coil placed in close proximity to the turns of said secondary coil included between the tap and the low-potential end of said secondary coil, a direct low-impedance path from the plate to one terminal of said primary coil, a direct low-impedance path from the other terminal of said primary coil to the filament, whereby the coupling between the plate circuit and said turns of the secondary coil is close, and a neutralizing capacity connected from said tap to said grid.

6. In an amplifier, a vacuum tube having a grid, a plate, a filament and grid-plate capacity coupling through which a capacity current flows from plate to grid, and means for neutralizing said grid-plate capacity coupling, said means including a first coil connected in the plate-filament circuit of said amplifier, a tuning condenser, a second coil coupled to said first coil by means including said tuning condenser, and a neutralizing capacity coupling said grid with said second coil and thereby conducting said capacity current away from said grid.

7. In an amplifier, a vacuum tube having a grid, a plate, a filament and grid-plate capacity coupling through which a capacity current flows from plate to grid, and means for neutralizing said grid-plate capacity coupling, said means including a first coil connected in the plate-filament circuit of said amplifier, a tuning condenser, a second coil coupled to said first coil by means including magnetic coupling and said tuning condenser, and a neutralizing capacity coupling said grid with said second coil and thereby conducting said capacity current away from said grid.

8. In an amplifier, a vacuum tube having a grid, a plate, a filament and grid-plate capacity coupling through which a capacity current flows from plate to grid, and means for neutralizing said grid-plate capacity coupling, said means comprising a first coil electrically coupled with the plate-filament circuit of said vacuum tube, a tuning condenser, a second coil coupled by said tuning condenser to said first coil, and a neutralizing capacity coupling said second coil with said grid and thereby conducting said capacity current away from said grid.

9. In an amplifier, a vacuum tube having a grid, a plate, a filament and grid-plate capacity coupling, and means for neutralizing said grid-plate capacity coupling, said means comprising a first coil connected in the plate-filament circuit of said vacuum tube, a second coil coupled magnetically to said first coil, a tuning condenser, a third coil coupled by said tuning condenser to said second coil, and a neutralizing capacity coupling said third coil with said grid.

10. In an amplifier, a vacuum tube having a grid, a plate, a filament and grid-plate capacity coupling, and means for neutralizing said grid-plate capacity coupling, said means comprising a first coil connected in the plate-filament circuit of said vacuum tube, a second coil closely coupled magnetically to said first coil, a tuning condenser, a third coil coupled by said tuning condenser to said second coil, and a neutralizing capacity coupling said third coil with said grid.

11. In an amplifier, a vacuum tube having a grid, a plate, a filament and grid-plate capacity coupling through which a capacity current flows from plate to grid, a single coil connected in the plate-filament circuit of said vacuum tube, a pair of coils connected in series at a junction point, magnetic coupling between said single coil and at least one of said pair of coils, and means for neutralizing said grid-plate capacity coupling, comprising a neutralizing capacity coupling said grid with said junction point and thereby conducting said capacity current away from said grid.

12. An amplifying vacuum tube provided with a grid, a filament, a plate, a grid circuit and a plate circuit; inherent capacity coupling between said grid circuit and said plate circuit, through which capacity coupling a capacity current flows from plate to grid; an output transformer comprising a primary coil connected in said plate circuit, and a tuned secondary coil having a tap intermediate the ends thereof; and a neutralizing capacity connected between said grid and said tap and serving to conduct said capacity current away from said grid.

13. A multi-stage radio-frequency amplifier comprising in each stage a vacuum tube having a grid, a plate, a filament, and grid-plate capacity coupling, the vacuum tube in a certain stage being coupled to that in the next succeeding stage by a tuned coupling system, said coupling system comprising three coils in a unitary structure and a tuning condenser connected between the grid and the filament in said succeeding stage, the first of said coils being connected in the plate-filament circuit of said certain stage and having reversed close magnetic coupling with one of the other two coils, said other two coils being connected in series between the terminals of said tuning condenser and having capacity coupling between their junction point and the grid of the vacuum tube in said certain stage, and means for preventing undesired magnetic coupling between stages.

14. In an amplifier, a vacuum tube having a grid, a plate, a filament and grid-plate capacity coupling thru which capacity current flows from plate to grid, and means for neutralizing said grid-plate coupling, said means comprising a primary inductance coil connected in the plate-filament circuit of said vacuum tube, a secondary inductance divided at a junction point into two coils one of which comprises a larger value of inductance than the other, one of said two coils being directly coupled magnetically to said primary coil, said two coils being electrically coupled by means including a tuning condenser connected across their extreme terminals, whereby the entire secondary inductance is effectively coupled to the primary inductance, and a neutralizing capacity connected between said grid and said junction point whereby to conduct said capacity current away from said grid.

In testimony whereof I affix my signature.

LOUIS ALAN HAZELTINE.